April 28, 1925.

F. R. WILSON 1,535,640

MOWING MACHINE CUTTER BAR

Filed Sept. 8, 1921

INVENTOR
*Frank R. Wilson*
BY
*Fred G. Dieterich*
ATTORNEYS

April 28, 1925.
F. R. WILSON
MOWING MACHINE CUTTER BAR
Filed Sept. 8, 1921
1,535,640
2 Sheets-Sheet 2
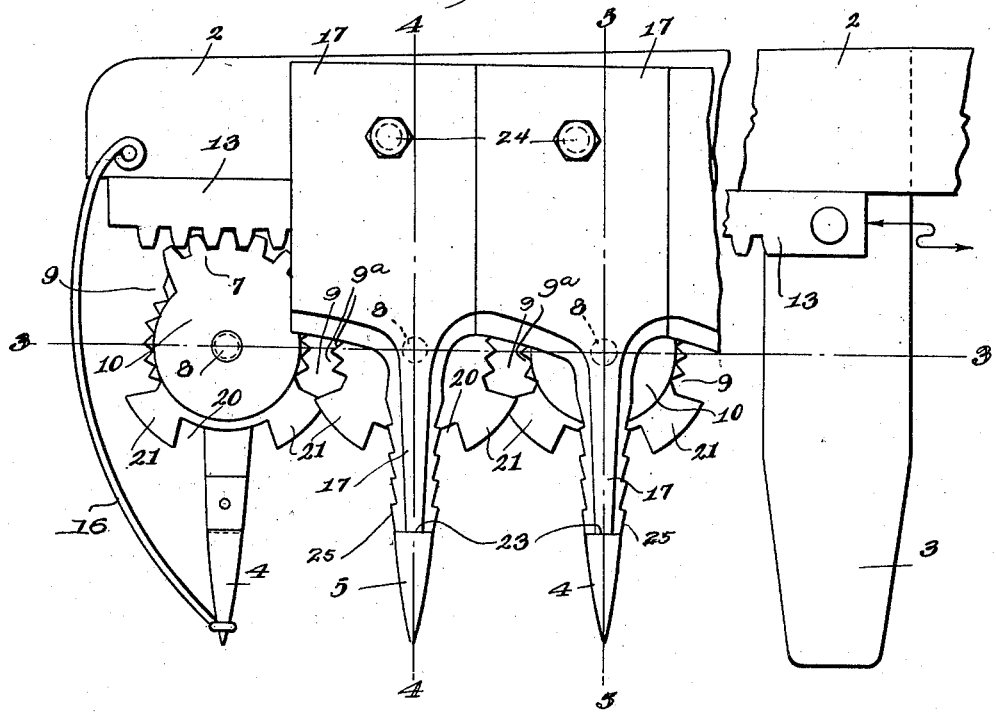
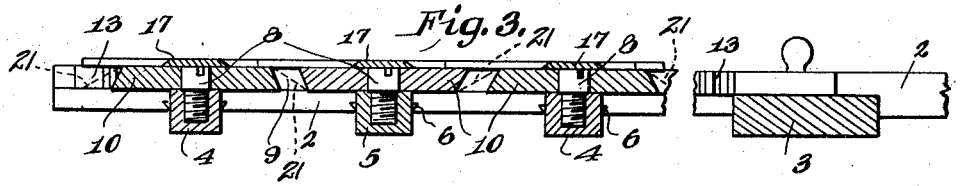
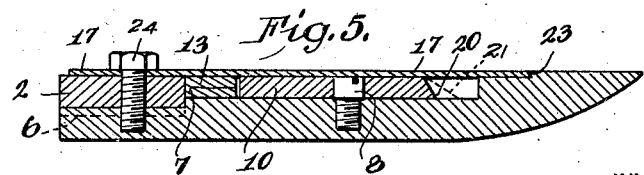
INVENTOR
Frank R. Wilson
BY
Fred G. Dieterich
ATTORNEYS Patented Apr. 28, 1925.

1,535,640

UNITED STATES PATENT OFFICE.

FRANK R. WILSON, OF ARDLEY, BRITISH COLUMBIA, CANADA, ASSIGNOR OF ONE-HALF TO JOHN MacLEOD, OF VANCOUVER, BRITISH COLUMBIA, CANADA.

MOWING-MACHINE CUTTER BAR.

Application filed September 8, 1921. Serial No. 499,129.

*To all whom it may concern:*

Be it known that I, FRANK R. WILSON, citizen of the United States, residing at Ardley, in the Province of British Columbia, Canada, have invented certain new and useful Improvements in Mowing-Machine Cutter Bars, of which the following is a specification.

This invention relates to a cutter head for a mowing or reaping machine, the object of the invention being to obtain a more effective and powerful cut by the use of rotary knives, which rotary knives are oscillated by an endwise movement derived in the same manner as that used at present for the reciprocating knives.

The invention is fully described in the following specification, reference being made to the drawings by which it is accompanied, in which:

Fig. 2 represents to a larger scale a short length of the cutter bar.

Figure 1:
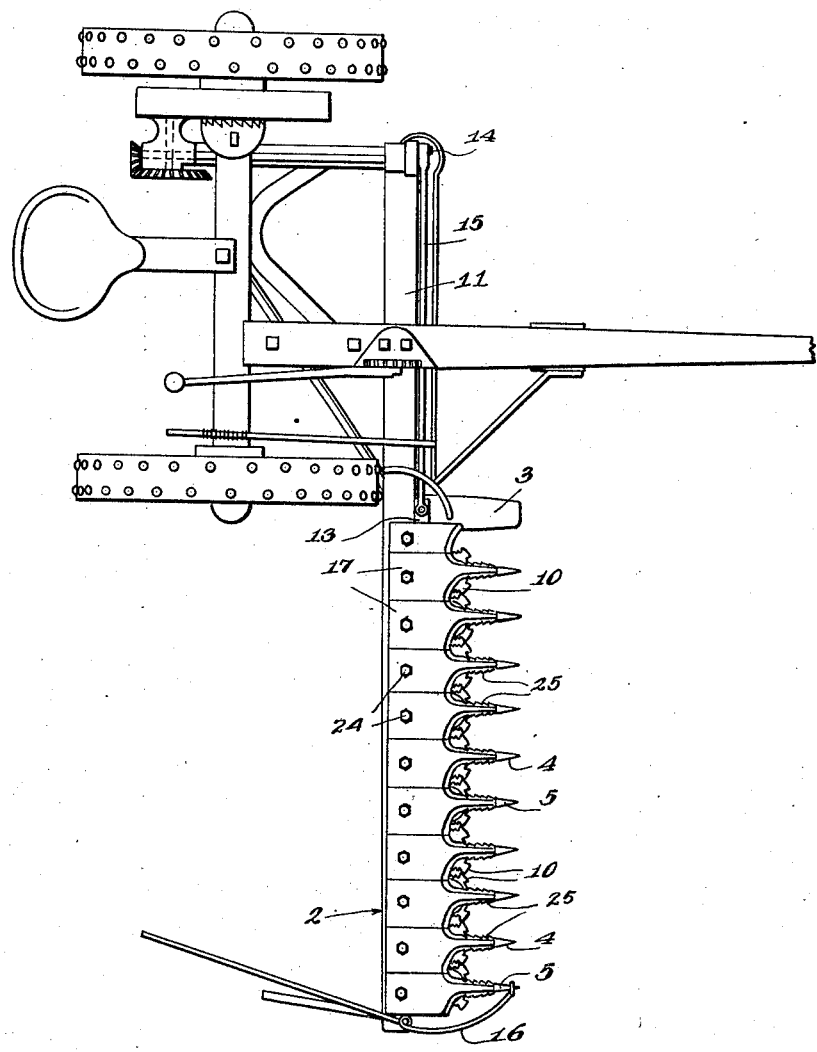
Fig. 1 shows a machine with the cutter bar which is the particular subject of this application.

Fig. 3, a longitudinal section of the same on the line 3—3 in Fig. 2, and

Figs. 4 and 5, sections on the lines 4 and 5 in Fig. 2, being longitudinal sections of adjacent teeth of the cutter bar.

Fig. 6 is a detail perspective view of one of the knife blades, per se.

In these drawings 2 represents a relatively rigid finger bar integral with the shoe 3 where the bar is secured to the draught frame 11 of the machine. On this bar 2 guard fingers 4 and 5 are secured at intervals apart, being fitted at 6 into dovetail notches in the finger bar and secured by screws or otherwise.

An oscillating knife blade 10 is pivotally mounted on a pin 8 screwed into the base of each finger 4 and 5, the blade being mounted on the head of the screw and retained thereon by a cover plate 17 fitted at 23 into an undercut recess of each finger and secured by a screw 24 to the finger bar 2. These cover plates 17 protect the operative parts of the oscillating blades from the intrusion of the cut grass, retain the blades on the pins 8 and prevent those pins from unscrewing.

The edges of the cover plates 17 where they coincide with those of the fingers 4 and 5 have ratchet like serrations 25 that will prevent the grass or grain stalks from moving forward from the action of the knife blades.

Each blade 10 is formed with a segmental gear or toothed portion 7 extending through an arc of approximately 70 degrees, the teeth of which arc engage corresponding teeth in a rack 13 endwise slidable on the upper sides of the fingers 4 and 5 and against the edge of the finger bar 2 from which the teeth project, the rack being thus retained in its slide and protected from the intrusion of grass, etc., by the cover plates 17.

On each side of the toothed portion 7 of each blade 10 a portion 9 is removed from it through an arc of approximately seventy (70°) degrees, the bottom of which removed portion is provided with V shaped notches 9ª, as shown in Figs. 2 and 6 of the drawing. Diametrically opposite the toothed arc 7 a portion 20 is removed through an arc of approximately fifty (50°) degrees, leaving a projecting portion 21 on each side of the removed portion 20. The side edges of these portions 21 form acute angles with the curvature of the outer edges of the projections.

The V shaped teeth, provided by the notches 9ª formed within the removed portions 9 are also bevelled from opposite faces and aid in the cutting operation by cooperating with the bases of the plates 17 and the respective oppositely moving projection 21 which laps and passes over its cooperating notches 9ª during a portion of its oscillatory movement.

By reference to Figures 3, 4 and 5, it will be seen that the alternating disks 10 being reversed with respect to one another, all the said disks occupy and are movable in the same plane; see dotted lines on said figures indicating the manner in which the projections 21 overlap and contact.

Reciprocating endwise movement is imparted to the rack bar 13 by a connecting rod 15 from a crank 14 in the manner usual with the ordinary reciprocating knife blade of such machines.

In use, the grass or grain stalks are, as the machine is moved forward, cut by the sides of the projecting portions 21, both against the sides of the fingers 4 and 5 and against the cutting edges of the adjacent knife blades. Also any stalks that may pass between the adjacent cutting knives, when the projections 21 of adjacent blades are moving away from one another, are cut by the sides of 21 and the V-shaped notches acting against the bases of the cover plates 17.

In common types of machines of this class the mass of grain or grass which is guided between a respective pair of guard fingers is cut against those fingers; in my invention, the cutting is effected by a plurality of cutting edges and at various places, thereby distributing the work and rendering it lighter both on the guides and the operating mechanisms, thus increasing the efficiency of my machine over the conventional types mentioned.

Further, the throw of crank necessary to effect the required movement of the knife blades, is reduced one-third, or from six inches throw to two inches.

A lateral guard member 16 may be provided and mounted as shown to form a protecting medium for the outermost cutting element.

Having now particularly described my invention, I hereby declare that what I claim as new and desire to be protected in by Letters Patent, is:

1. A cutting means for mowing machines, said means comprising a supporting bar horizontally projecting from and carried by the mowing machine, forwardly projecting fingers carried by the bar, a series of oscillating knife members all mounted in the same horizontal plane and each carried by a projecting finger, the knife members each having projections, said projections being bevelled to provide cutting edges, the knife members being arranged so that the bevels of the projections of successive knife members are oppositely directed that they may overlap, and means for oscillating all of the knife members simultaneously.

2. A cutting means for mowing machines, said means comprising a supporting bar horizontally projecting from and carried by the mowing machine, forwardly projecting fingers carried by the bar, a series of oscillating knife members all mounted in the same horizontal plane and each carried by a projecting finger, the knife members each having projections said projections being bevelled to provide cutting edges, and bevelled notched portions, the bevels of the projections of successive knife members being oppositely directed and the corelation of the said members so arranged that they may overlap to the extent of the bevels of the projections, and means for oscillating all of the knife members simultaneously.

3. A cutting means for mowing machines, said means comprising a supporting bar horizontally projecting from and carried by the mowing machine, forwardly projecting fingers carried by the bar, a series of oscillating knife members all mounted in the same horizontal plane and each carried by a projecting finger, the knife members each having projections, said projections being bevelled to provide cutting edges, bevelled-notched portions and a gear segment, the bevels of the projections of successive knife members being oppositely directed and the corelation of the said members so arranged that they may overlap to the extent of the bevels of the projections, and a reciprocating gear rack for engaging all of the gear segments to oscillate all the knife members simultaneously.

4. A cutting means for mowing machines, said means comprising a supporting bar horizontally projecting from and carried by the mowing machine, forwardly projecting fingers carried by the bar, a series of oscillating knife members all mounted in the same horizontal plane and each pivoted to a projecting finger, the knife members each having projections said projections being bevelled to provide cutting edges, and bevelled-notched portons, the bevels of the projections of successive knife members being oppositely directed and the corelation of the said members so arranged that they may overlap to the extent of the bevels of the projections, means for oscillating all of the knife members simultaneously, and guard plates secured to the bar and having portions extending over the knife members to hold them against displacement from their pivots.

5. A cutting means for mowing machines, said means comprising a supporting bar horizontally projecting from and carried by the mowing machine, forwardly projecting fingers carried by the bar, a series of oscillating knife members all mounted in the same horizontal plane and each pivoted to a projecting finger, the knife members each having projections said projections being bevelled to provide cutting edges, and bevelled-notched portions and a gear segment, the bevels of the projections of successive knife members being oppositely directed and the corelation of the said members so arranged they overlap to the extent of the bevels of the projections, a reciprocating gear rack for engaging all of the gear segments to oscillate all the knife members simultaneously, and guard plates secured to the bar and having portions extending over the knife members to hold them against displacement from their pivots and being notched to cooperate in the cutting action.

6. A cutting means for mowing machines, said means comprising a supporting bar horizontally projecting from and carried by the mowing machine, forwardly projecting fingers carried by the bar, a series of oscillating knife members all mounted in the same horizontal plane and each pivoted to a projecting finger, the knife members each having projections said projections being bevelled to provide cutting edges, and bevelled-notched portions and a gear segment, the bevels of the projections of successive knife members being oppositely directed and the corelation of the said members so arranged that they may overlap to the extent of the bevels of the projections, a reciprocating gear rack for engaging all of the gear segments to oscillate all the knife members simultaneously, and guard plates secured to the bar and adapted to cover the gear segments and rack and having portions extending over the knife members to hold them against displacement from their pivots and being edge sharpened and notched to cooperate in the cutting action, the fore edge of the guard plates proper being also sharpened and angle shaped for like purpose.

7. A cutting means for a mowing machine, said means comprising a finger bar horizontally projecting from and carried by the mowing machine, said bar having a series of guard fingers secured to it to project from its forward edge, a substantially circular knife blade pivotally mounted on each guard finger, each blade having cutting projections V shaped notches throughout the major arc of its circumference and gear teeth formed throughout the remainder of its circumference, the cutting projections of the blades being bevelled, guard plates secured to the bar and projecting over the rack and gear teeth portion of the blades, and means for endwise moving the rack bar by a connecting rod from a crank operated by the movement of the machine.

8. A cutting means for a mowing machine, said means comprising a finger bar horizontally projecting from and carried by the mowing machine, said bar having a series of guard fingers projecting from its forward edge, a series of knife blades pivotally mounted on the guard fingers, each blade being substantially circular and having portions removed from its circumference to form cutting projections and gear teeth formed in another portion of the circumference, said knife blades being spaced apart from one another an amount at least equal to the depth of their removed portions and bevelled to form cutting edges in the plane of their overlapping contact, means for oscillating the knives, said means comprising a toothed rack member endwise movable in the horizontal bar the teeth of which rack mesh with those of the knife blades, and means for endwise moving the rack bar.

In testimony whereof I affix my signature.

FRANK R. WILSON.